3,473,740
GRANULATION OF FINE PARTICLES
Walter M. Davis, Marblehead, Mass., assignor to Monsanto Company, St. Louis, Mo., a corporation of Delaware
Filed June 19, 1967, Ser. No. 646,901
Int. Cl. B02c 21/00
U.S. Cl. 241—3                               6 Claims

ABSTRACT OF THE DISCLOSURE

A procedure for the production of granular particles from discrete, fine particles by forming a bed of the discrete, fine particles, heating the bed to melt the upper surface of the bed of discrete particles, chilling and solidifying the beds by contacting the same with a cooling medium, and comminuting the solidified bed into granular particles.

---

Figure 1:
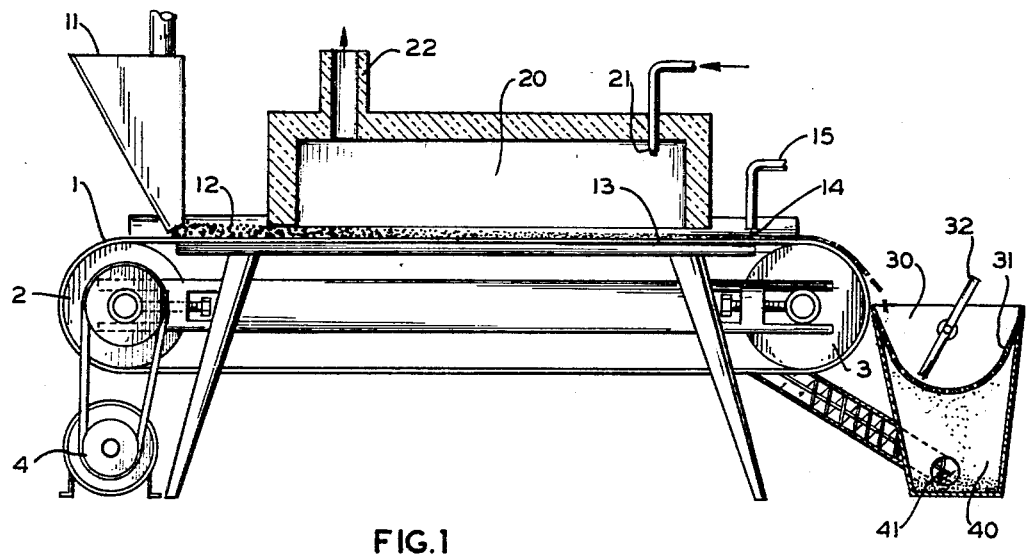

The present invention relates to the production of granular particles of a commercial grade from discrete, fine particles, and is particularly directed to the production of granules of salts from fine particles that would otherwise be of lower economic value.

Many industrial processes require that a medium size particle be obtained as the product. For example, in the manufacture of detergent compositions, a medium size particle product is required in order to provide satisfactory solubility without caking or lumping. However, if the products are obtained as very fine particles, e.g., 200 mesh or less, a serious dusting problem results. It is usually impossible to avoid the production of a high proportion of fine particles in normal grinding and processing operations, although such fine particles are undesirable because of their lower economic value.

In some of the processes employed in the past, for example in granular detergent manufacture, it has been the practice to recycle the excess fine particles to the manufacturing process for redissolving, spray drying and grinding to the desired medium particle size range. However, the proportions of such fine particles may easily be of the magnitude of 50% or more, so that the processing equipment must be made unduly large when following this procedure.

Another difficulty which has been encountered in prior art processes, is the inability to obtain particles of high bulk density. For example, usual particulate phosphate salts used in detergent applications have a quite low density which is undesirable in certain applications. Attempts have been made to increase the bulky density of such particulate materials by passing the particles between densifying rollers. However, this requires still another grinding or comminution step to obtain the desired particle size with the formation of additional fines.

It has now been found that the granulation of particulate salts to obtain larger particles which are also of higher bulk density may be carried out by a novel process. In this process, a bed of discrete particles of the fine feed material preferably a horizontal bed is heated to a temperature sufficient to fuse, or actually to melt to the liquid state, the upper surface of the bed while maintaining such fused or liquid upper portion of the bed upon unmelted particles of the feed material. The feed materials may be any fusible salts, preferably having a melting point below 900° C., for example sodium sulfite, potassium sulfate, and the alkali phosphates such as sodium tripolyphosphate.

The second stage of the process is the chilling and solidifying of the said fused or liquid layers to a solid form by radiation, conduction or convection, for example, by contacting the same with a cooling or chilling medium at a temperature lower than that of the said fused bed. The chilling medium may be a fluid such as air, steam, water mist, or a steam of particles of the same salt or another particulate material which it is desired to mix with the product. The solid proudct is then broken, or comminuted into particles of the desired size.

The present process also has the advantage that the feed stock composed of fine particles of low bulk density is transformed into a high density product as a result of the fusion, or liquefaction and subsequent solidification and breaking of the solidified product. For example, sodium tripolyphosphate as obtained in commercial processes ordinarily has a bulk density of about 0.5 to 1.0 However, upon treatment of such a product, as a feed of less than 100 mesh, by the process of the present invention using a stainless steel belt as the support for a ½ inch bed of sodium tripolyphosphate fines the product obtained as a bulk density of from 1.0 to 1.4 grams per cc.

The present process is also characterized by the reduction of the dusting characteristics of the discrete, fine particles of the salts which are treated. For example, the production of inorganic salts such as sodium sulfate, magnesium sulfate, sodium chloride, sodium carbonate and the various sodium phosphates, e.g., sodium pyrophosphates, sodium metaphosphates, and sodium hexametaphosphates is invariably accompanied by the production of considerable amounts of dusts, e.g., very fine, discrete particles which readily escape into the air and cause disposal problems. The present process, however, in densifying and granulating fine particles into larger granules, substantially overcomes the dusting problem.

Another advantage of the present process is the ease of handling very corrosive inorganic salts. As has been pointed out above, the fusing or melting of the salt upon the upper layer of a bed of particles of the salt, while maintaining the lower portion of the bed as an intact mass of particulate materials, makes it possible to handle the material without contacting the molten salt against any metal or ceramic. This eliminates problems of corrosion which would be encountered if the same materials were heated directly upon a metallic or ceramic surface.

This is particularly advantageous because of the relatively higher temperature, e.g., 600° C. to 1200° C., a preferred range being 800° C. to 1000° C., at which the present process is operated. For example, sodium tripolyphosphate corrodes metals at such temperatures with resultant contamination of the product while ceramic containers are likewise fluxed by the molten salts with resultant breakdown of the surface or vessel, as well as contamination of the product. The instant process is carried out by forming a bed of the material upon a moving surface, such as a rotating metal or ceramic belt or disc. A layer of the feed material of fine particle size, e.g., less than ½" particle size, or preferably less than 100 mesh particle size, is deposited upon the metal or ceramic substrate which is then subjected to a moving flame, or moved with its attendant load of fine particles into a heating zone. The temperature which is employed in this stage must be sufficient to fuse the upper surface of the fine particles to consolidate them to a cohesive bed or an actual liquid surface disposed upon unfused particles.

A typical operating temperature when granulating sodium tripolyphosphate fines is 1200° C. which is substantially above the melting point of approximately 900° C. for this product. It has been observed that the melting of the bed from a gas flame, or radiant heater located above the bed, produces a distinct temperature gradient through the bed of the particles with the fused, liquid or molten phase at the top and providing a distinct interface from the fine particles existing as a particulate solid phase below the liquid. The degree to which melting takes place is controllable by varying the temperature or contact time, but it is preferred that at least 30% of the thickness of the original bed of fine particles be maintained in a molten condition.

The second step consists of a chilling of the liquified or fused consolidated product. This is done by indirect or direct heat exchange such as by radiation to a water jacket or by directing a stream of a medium as air, steam or water mist at a temperature less than that of a molten product upon the exposed face or periphery thereof. As a result of such a chilling step, the molten or fused phase is consolidated to a cohesive sheet of solid or fused granulated product. This product is removed from the belt or disc and is then broken into densified granules of the desired particle size. Any fines which result may be recycled to the process. However, when operating with a rotating flat disc upon which the process is carried out in a substantially horizontal plane, the unmelted fine particles may be retained upon the disc and serve as the substrate for the addition of further fine particle feed.

The moving belt or disc is usually situated in a substantially horizontal position. However, considerable deviation from the horizontal can be employed, not only to the angle of repose of the granular feed but at even greater angles because of the retention of the particles to the moving bed as the particles fuse and melt.

The drawings forming a part of the present application, illustrate representative specific embodiments for carrying out the present process, which, however, is not limited thereto.

Figure 2:
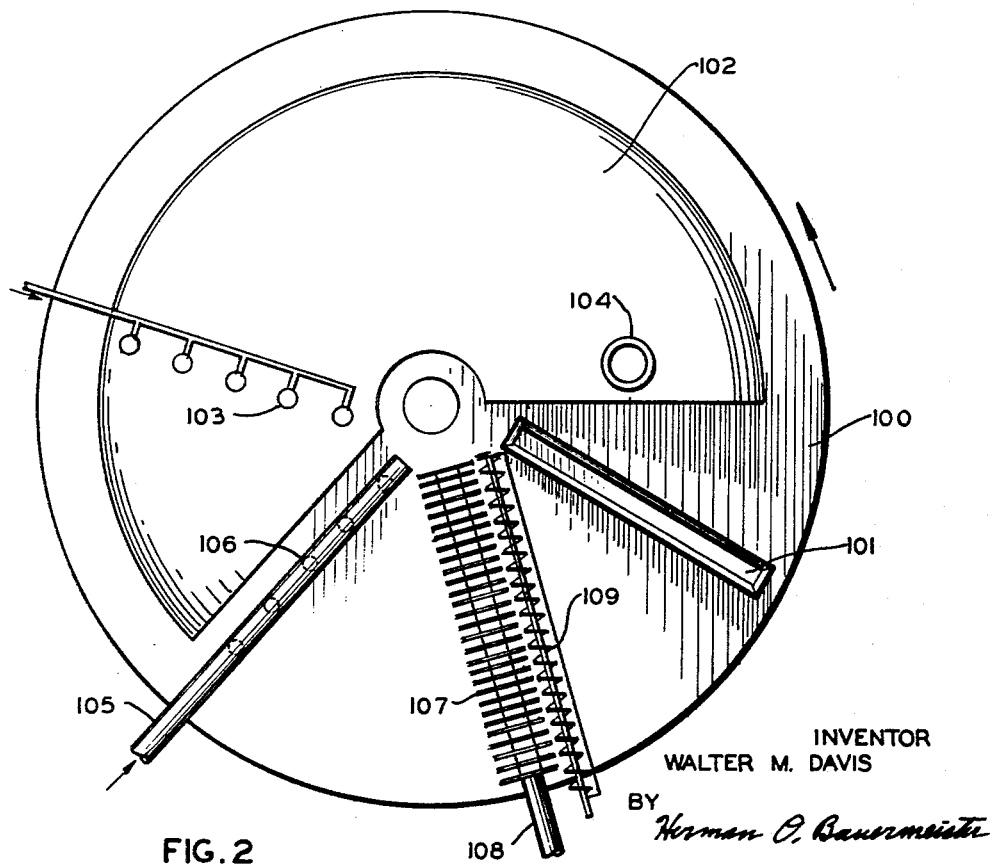

FIGURE 1 illustrates a continuous belt used as the substrate, while FIGURE 2 shows a horizontal disc employed for the same purpose.

In FIGURE 1 a continuous belt 1, of stainless steel, is rotated or is moved between pulleys 2 and 3 provided with a drive system 4. The feed consisting of a finely powdered form of inorganic salts is supplied from feed hopper 11 which deposits a uniform layer of the finely divided discrete particles as a layer or bed 12 upon belt 1. In order to consolidate the discrete fine particles, bed 12 on the belt is moved under furnace section 20 provided with a gas burner 21 and an outlet stack 22. In the furnace zone the layer of fine particles is melted at the upper surface thereof to obtain a continuous ribbon or sheet 13, of the feed material. A blast of cooling air 14 or other cooling medium is supplied from pipe 15, thus chilling and solidifying the solid product. As a result of further movement of the stainless steel belt 1, the solid product separates from the belt as the belt rotates around pulley 3. The solidified mass is broken into finer particles by grinding means 30, which may be provided with a screen 31 or with separate screening means, to separate the larger size particles, e.g., larger than 100 mesh and less than 20 mesh. The fine particles, 40, of less than 100 mesh size are recycled to the feed end of the process from outlet 41, while the particles greater than 100 mesh size are removed from grinder 30 by horizontal withdrawal of the screw conveyer 32.

Another embodiment of the invention is shown in FIGURE 2.

In this method of carrying out the invention, a rotating horizontal disc 100 is employed as the working surface upon which the powder feed is supplied from feed hopper 101.

Rotation of disc 100 carries the charge of fine, discrete particles under an arch or muffle 102 constituting the heating zone in which fuel gas is supplied at burner 103. The combustion gases escape at stack 104. Further rotation of the disc with the top surface fused carries this charge to cooling or chilling nozzles 106 receiving a stream of air from line 105. The chilling effect of the air or other medium results in solidification of the fused or molten salt. Steel fingers or cutters 107 then break up the mass of broken pieces which are removed by conveyer 109.

What is claimed is:

1. Process for the formation of granules from discrete, fine particles of a fusible salt, which comprises forming a bed of discrete particles of the aforesaid salt, heating the said bed to a temperature sufficient to fuse the upper surface of the said bed of discrete particles while maintaining the lower portion of the bed as a mass of discrete particles, chilling and solidifying the said fused upper surface of the bed by contacting the same with a chilling medium at a temperature lower than that of the said fused upper surface, and comminuting the said solidified upper surface into particles.

2. Process for the granulation of particles of a fusible salt, which comprises forming a horizontal bed of discrete particles of the aforesaid salt, heating the said bed to a temperature sufficient to melt the upper surface of the bed of discrete particles, the said fluid upper surface being disposed upon unmelted particles of the said salt, chilling and solidifying the said bed by contacting the same with a chilling medium selected from the group consisting of solids, liquids and gases at a temperature lower than that of the said fluid bed, and comminuting the said solidified bed into granular particles in the size range of from one-half inch to one-hundred mesh.

3. Process as in claim 1 in which the salt is sodium tripolyphosphate and in which the chilling medium is air.

4. Process as in claim 1 in which the salt is sodium tripolyphosphate and the chilling medium is composed of articles of sodium tripolyphosphate.

5. Process as in claim 1 in which the horizontal bed moves horizontally between the heating and the chilling zones with a declining temperature gradient being maintained from the said heating to the said chilling zones.

6. Process as in claim 2 in which the particles produced are separated to isolate particles less than 100 mesh, and the said fine particles are recycled to the said heating step.

References Cited

UNITED STATES PATENTS

| 2,306,665 | 12/1942 | Schwarzkopf | 75—213 |
| 3,058,967 | 10/1962 | Nickerson | 241—3 X |
| 3,152,201 | 10/1964 | Kumnick | 241—3 |

ROBERT C. RIORDON, Primary Examiner

D. G. KELLY, Assistant Examiner

U.S. Cl. X.R.

241—18, 23